(12) United States Patent
Wang et al.

(10) Patent No.: US 11,772,091 B2
(45) Date of Patent: Oct. 3, 2023

(54) METHOD AND APPARATUS FOR TREATING, SORTING AND RECYCLING OIL-CONTAINING DISCHARGED CATALYST

(71) Applicants: Shanghai Huachang Environmental Protection Co., Ltd, Shanghai (CN); Sichuan University, Sichuan (CN)

(72) Inventors: Hualin Wang, Shanghai (CN); Pengbo Fu, Shanghai (CN); Zhaohui Huang, Shanghai (CN); Aibin Huang, Shanghai (CN); Cheng Huang, Shanghai (CN); Jianhuai Sun, Shanghai (CN); Ying Zhao, Shanghai (CN); Liquan Li, Shanghai (CN); Chonggang Chen, Shanghai (CN); Qian Zeng, Shanghai (CN); Jianping Li, Shanghai (CN); Yilin Fang, Shanghai (CN); Fei Wang, Shanghai (CN); Xia Jiang, Sichuan (CN)

(73) Assignees: Shanghai Huachang Environmental Protection Co., Ltd, Shanghai (CN); Sichuan University, Sichuan (CN)

( * ) Notice: Subject to any disclaimer, the term of this patent is extended or adjusted under 35 U.S.C. 154(b) by 832 days.

(21) Appl. No.: 16/646,330
(22) PCT Filed: Dec. 8, 2017
(86) PCT No.: PCT/CN2017/115129
§ 371 (c)(1),
(2) Date: Mar. 11, 2020
(87) PCT Pub. No.: WO2019/052032
PCT Pub. Date: Mar. 21, 2019

(65) Prior Publication Data
US 2020/0269229 A1    Aug. 27, 2020

(30) Foreign Application Priority Data
Sep. 13, 2017 (CN) .......................... 201710821746.2

(51) Int. Cl.
*B01J 38/58* (2006.01)
*B01D 45/16* (2006.01)
(Continued)

(52) U.S. Cl.
CPC ................ *B01J 38/58* (2013.01); *B01D 5/00* (2013.01); *B01D 45/16* (2013.01); *B01J 8/0055* (2013.01);
(Continued)

(58) Field of Classification Search
CPC ... B01J 38/58; B01J 8/0055; B01J 8/16; B01J 38/10; B01J 38/56; B01J 38/72;
(Continued)

(56) References Cited

U.S. PATENT DOCUMENTS 2,862,873 A * 12/1958 Hall ...................... C10G 11/18
422/223
4,661,265 A     4/1987 Olson et al.
2006/0096890 A1  5/2006 Pankaj et al.

FOREIGN PATENT DOCUMENTS

CN      1557977 A    12/2004
CN    101380597 A     3/2009
(Continued)

OTHER PUBLICATIONS

International Search Report in corresponding PCT Patent Application No. PCT/CN2017/115129, dated May 25, 2018.
(Continued)

*Primary Examiner* — Colin W. Slifka
*Assistant Examiner* — Logan Edward Laclair
(74) *Attorney, Agent, or Firm* — Melissa Hunter-Ensor; Nathan Hsu; Greenberg Traurig, LLP (57) ABSTRACT

The present disclosure relates to a method and an apparatus for treating, sorting and recycling an oil-containing discharged catalyst. There is provided a method for treating,
(Continued)

sorting and recycling an oil-containing discharged catalyst, wherein the method comprises the following steps: (A) cyclonic washing and on-line activation of a discharged catalyst; (B) cyclonic spinning solvent stripping of the catalyst; (C) gas stream acceleration sorting of a high activity catalyst; (D) cyclonic restriping and particle capture of the high activity catalyst; and (E) cooling of the gas and condensation removal of the solvent. There is further provided an apparatus for treating, sorting and recycling an oil-containing discharged catalyst.

10 Claims, 2 Drawing Sheets

(51) Int. Cl.
| | | |
|---|---|---|
| *B01J 38/10* | (2006.01) | |
| *B01J 38/56* | (2006.01) | |
| *C10G 11/18* | (2006.01) | |
| *C10G 45/20* | (2006.01) | |
| *C10G 45/56* | (2006.01) | |
| *C10G 47/30* | (2006.01) | |
| *B01J 38/72* | (2006.01) | |
| *B01J 8/00* | (2006.01) | |
| *B01D 5/00* | (2006.01) | |
| *B01J 8/16* | (2006.01) | |

(52) U.S. Cl.
CPC ................ *B01J 8/16* (2013.01); *B01J 38/10* (2013.01); *B01J 38/56* (2013.01); *B01J 38/72* (2013.01); *C10G 11/182* (2013.01); *C10G 45/20* (2013.01); *C10G 45/56* (2013.01); *C10G 47/30* (2013.01); *C10G 2300/1055* (2013.01); *C10G 2300/706* (2013.01); *C10G 2400/04* (2013.01)

(58) Field of Classification Search
CPC . B01J 27/043; B01J 27/30; B01J 38/02; B01J 38/04; B01J 38/48; B01D 5/00; B01D 45/16; C10G 11/182; C10G 45/20; C10G 45/56; C10G 47/30; C10G 2300/1055; C10G 2300/706; C10G 2400/04
See application file for complete search history.

(56) References Cited

FOREIGN PATENT DOCUMENTS

| CN | 102441527 A | | 5/2012 |
|---|---|---|---|
| CN | 102698815 | * | 5/2012 |
| CN | 102698815 A | | 10/2012 |
| CN | 102698818 A | | 10/2012 |
| CN | 103272653 A | | 9/2013 |
| CN | 104826670 A | | 8/2015 |

OTHER PUBLICATIONS

Li et al., "The enhancement on the waste management of spent hydrotreating catalysts for residue oil by a hydrothermal-hydrocyclone process," Catalysis Today, 2016, vol. 271, pp. 163-171.

* cited by examiner

METHOD AND APPARATUS FOR TREATING, SORTING AND RECYCLING OIL-CONTAINING DISCHARGED CATALYST

CROSS REFERENCE TO RELATED APPLICATIONS

This application is a U.S. National Phase application under 35 U.S.C. 371 of International Application No. PCT/CN2017/115129, filed Dec. 8, 2017, which claims priority to and the benefit of Chinese Application No. 201710821746.2 filed Sep. 13, 2017, the disclosure of each of which is incorporated herein by reference.

TECHNICAL FIELD

The disclosure pertains to the field of petrochemical industry and environmental protection, and relates to a method and an apparatus for treating, sorting and recycling an oil-containing spent catalyst discharged from a reactor, with an aim to realize recovery of an oil phase and sorting and recycling of a high activity catalyst from the oil-containing spent catalyst discharged from the reactor. In particular, the disclosure relates to a method and an apparatus for treating, sorting and recycling of an oil-containing discharged catalyst.

BACKGROUND ART

35% of global GDP depends on catalysis. The amount of industrial catalysts used is up to 800,000 tons/year, of which about 750,000 tons/year is used for oil refining and chemical industry. The global sales amount of the catalysts exceeds 16.3 billion US dollars, including about 10.2 billion US dollars (62.5%) from oil refining and chemical industry which create a market value of relevant products of more than 1.63 trillion US dollars. The catalytic activity of a catalyst may be degraded gradually in use due to deactivation and passivation. The spent catalyst has to be discharged, and a fresh catalyst has to be replenished. The widespread use of catalysts causes problems relating to discharge and treatment of a large amount of deactivated catalysts. The specific problems include:

(1) A large amount of petroleum hydrocarbon pollutants and heavy metals are entrained in the discharged catalysts which thus become hazardous waste. If not treated properly, the hydrocarbons in the discharged catalysts may be transferred easily to the environment, jeopardizing the ecological environment and human health. Furthermore, the discharged catalyst contains a large portion of utilizable petroleum resources. Taking a catalyst discharged from a fluidized bed for hydrogenation of residual oil as an example, 1 t catalyst (skeletal mass) carries 1.5 t oil on average, wherein the oil absorbed in the catalyst pores reaches 0.52 t. If the large amount of petroleum hydrocarbon pollutants entrained in the discharged catalysts is not recovered but incinerated simply, it will be a terrible waste of the oil resources.

(2) Catalysts having high activity and low activity are intermixed in the discharged catalysts. For example, in the catalysts discharged from a domestic fluidized bed apparatus, based on the total mass of the discharged catalysts, 54% of the catalyst particles still have 80% of the initial catalytic activity, while only 14.5% of the catalyst particles have a relative activity of less than 50%. If the discharged catalysts having both high activity and low activity are discarded together, while fresh catalysts have to be continuously added in the same amount of the discharged catalysts in order to maintain a certain equilibrium catalyst activity in the reactor, the fluidized bed will consequently consume a large amount of catalysts.

Currently, oil-containing discharged catalysts are industrially treated mainly by landfill and incineration, which not only results in substantial waste of resources and occupation of a lot of land, but also causes pollution to soil and water environments. In addition, sulfur and other specifies will enter into the atmospheric environment and form a secondary source of pollution during burning.

Therefore, a technique by which the oil phase entrained in an oil-containing discharged catalyst is separated and recovered and a high activity catalyst is sorted and recycled is a key to establishment of an environmentally friendly, resource-saving and sustainably developable petrochemical process.

Chinese Patent Application CN 200410021093.2 discloses a method for treating a spent catalyst, wherein a spent catalyst is subjected to continuous dry distillation at a temperature of 400-800° C. for 1-2.5 hours to obtain an oil-phase-containing dry-distilled gas and catalyst particles, thereby fulfilling a process for removing oil from the catalyst. However, the dry distillation temperature is high in this method, which tends to cause cracking of the oil. In addition, the treatment time is long, and the process flow is complex.

Chinese Patent Application CN 200810218580.6 discloses a method for removing oily specifies from a petrochemical spent catalyst, wherein, based on the weight of the oil-containing petrochemical spent catalyst, 0.5-1.0 wt. % water soluble polymer dispersant is added into the oil-containing petrochemical spent catalyst, and distillation is performed under heating for 60 min at a pressure of 1.50-$6.0 \times 10^4$ Pa and a temperature of 300-600° C., followed by condensation and collection of the distilled oil to achieve removal of the oil from the discharged catalyst. However, this method also suffers from high energy consumption, inconvenient operation, and difficulty in widespread application.

U.S. patent application U.S. Pat. No. 4,661,265 discloses a method for separating oil from a catalyst discharged from a reactor, wherein the oil seeps from the gap between screws under the gravity of the oil during screw conveyance, so that separation of the oil from the catalyst is accomplished. However, this method suffers from low efficiency of oil removal, and the treated catalyst still entrains a large amount of oil phase.

In order to enhance the efficiency of oil removal from a discharged catalyst, Chinese Patent Application CN 201210147625.1 discloses a method and an apparatus for treating a catalyst discharged from a fluidized bed for hydrogenation of residual oil, involving three processes: (i) regulation and reduction of viscosity; (ii) cyclonic desorption and separation, and (iii) oil-water-catalyst triphase separation and resource utilization. The flow shear force of the rotating flow field is used to desorb and separate the absorbed oil from the surfaces and internal pores of solid particles. This method has the advantages of a simple process, high efficiency of oil removal, low operating cost, and good operability. Further, Chinese Patent Application CN 201210208583.8 discloses a method and an apparatus for staged desorption treatment of a catalyst discharged from a fluidized bed for hydrogenation of residual oil, wherein the following three steps are involved: (A) decanting of oil by settling under gravity, storage and regulation; (B) hot water microcyclonic desorption and hot water circulation; and (C) microcyclonic solvent extraction and solvent circulation. A joint use of the hot water microcyclonic desorption process and the microcyclonic solvent extraction process effects staged desorption treatment of oil phases having different adsorption energies, thereby further improving the oil phase desorption efficiency. The use of the hot water cyclonic desorption technique for removal of oil from a discharged catalyst is also reported in a paper by Jian-Ping Li (The enhancement on the waste management of spent hydrotreatingcatalysts for residue oil by a hydrothermal-hydrocyclone process, Catalysis Today, 271 (2016), 163-171). The above techniques all take advantage of the high flow shear force in a cyclone and the high-speed spinning of the catalyst particles to reinforce the desorption process of the oil in the pores of the catalyst particles. However, the above methods use water as a medium which has an impact on the mechanical properties of the catalyst particles, undesirable for reuse of the catalyst. In addition, the above methods and apparatus are only directed to oil removal treatment of discharged catalysts, unable to sort out and reuse most high activity catalysts in the catalyst particles from which oil has been removed. After oil removal, the catalysts having both high and low activities are treated together by direct landfill which reduces environmental pollution of oil pollutants while the oil resource is recovered, but still leads to waste of a large quantity of the high activity catalyst resource.

Accordingly, there is an urgent need in the art to develop an efficient, environmentally friendly, energy-saving, simple-process method and a corresponding apparatus for treating an oil-containing discharged catalyst, so as to fulfil the aim of efficient recovery of oil from the discharged catalyst as well as sorting and recycling of the high activity catalyst in the discharged catalyst.

SUMMARY

The present disclosure provides a novel method and a novel apparatus for treating, sorting and recycling an oil-containing discharged catalyst, thereby solving the problems existing in the prior art.

One technical problem to be solved by the present disclosure is that: oil-containing discharged catalysts are currently treated with complicated processes at high cost, wherein secondary pollution is inclined to occur, the recovery efficiency of oil phases is not high, and highly efficient separation of oil droplets entrapped in the pores of catalyst particles is especially difficult, resulting in waste of resources. The present disclosure utilizes the "like dissolves like" rule to wash asphaltenes, resins and heavy aromatics out of a discharged catalyst, and at the same time, utilizes the high-speed spinning of the catalyst particles in the cyclonic field to reinforce the processes of washing and desorbing the pollutants in the catalyst pores, so as to renew the catalyst surface, strengthen the active sites and realize on-line activation of the catalyst. The process is simple and ready to carry out, and provides high efficiency in removing oil from the catalyst pores.

Another technical problem to be solved by the present disclosure is that: the existing processes for treating oil-containing discharged catalysts are only limited to removing oil from the catalysts, while the large quantity of high activity catalysts in the discharged catalysts are not sorted out for reuse, or the sorting efficiency is not high, leading to problems of high consumption of fresh catalysts, large discharge of hazardous wastes from the apparatus, etc. Based on the pulsing gas acceleration classification rule, the present disclosure achieves separation of catalysts having high activity from those having low activity by making use of the different accelerations of the high activity catalyst and the low activity catalyst having different particle densities in a pulsing gas flow field where the catalyst particles have different tracks and displacements. The advantages include high sorting efficiency and sensitivity to minute density difference.

In one aspect, the present disclosure provides a method for treating, sorting and recycling an oil-containing discharged catalyst, wherein the method comprises the following steps:

(A) cyclonic washing and on-line activation of a discharged catalyst: asphaltenes, resins and heavy aromatics in the discharged catalyst are subjected to cyclonic washing to achieve on-line activation of the catalyst;

(B) cyclonic spinning solvent stripping of the catalyst: catalyst particles obtained in step (A) are subjected to high-temperature gas cyclonic spinning reinforced stripping to remove a solvent entrained in the catalyst;

(C) gas stream acceleration sorting of a high activity catalyst: high activity catalyst particles are sorted out from the catalyst obtained in step (B) on the basis of the kinematics regularity that a high activity catalyst and a low activity catalyst have different net pulsing displacement directions in a pulsing gas flow field due to their difference in particle density;

(D) cyclonic restriping and particle capture of the high activity catalyst: the high activity catalyst particles discharged along with the gas stream after the sorting in step (C) are further subjected to cyclonic spinning reinforced solvent stripping, while cyclonic capture of the catalyst particles is performed at the same time to recycle the high activity catalyst particles; and (E) cooling of the gas and condensation removal of the solvent: the gas is cooled after the cyclonic capture in step (D), and the entrained solvent is condensed, so as to obtain a pure gas for circulation.

In a preferred embodiment, in step (A), the cyclonic washing is based on the "like dissolves like" rule, wherein the discharged catalyst includes liquid-containing solid particles in a process selected from the group consisting of heavy oil hydrogenation, catalytic reformation, catalytic cracking, hydrocracking and hydrogenation refining; and wherein the solvent used is gasoline, diesel or an organic solvent that is similar to and dissolves asphaltenes, resins and heavy aromatics in the discharged catalyst;

the cyclonic washing is performed in a cyclonic field, wherein oil on a surface of the discharged catalyst and in pores of the discharged catalyst is subjected to cyclonic reinforced washing under a mechanical detaching action in a high-speed shear force field in the cyclonic field and a centrifugal desorption action of high-speed spinning of the catalyst particles on pollutants in the pores; and the discharged catalyst particles spin at a high speed in the cyclonic field to renew catalyst particle surface covered by heavy hydrocarbons, and strengthen active sites of the catalyst, so as to achieve on-line activation of the catalyst.

In another preferred embodiment, in step (B), the solvent stripping is performed in a cyclonic field, wherein high-speed spinning of the particles in the cyclonic field accelerates renewal of a contact interface between the solvent on the particle surface and the gas stream, so as to reinforce the stripping process for removing the solvent, wherein the gas is nitrogen, hydrogen, dry gas or low gas, and a temperature is 200-400° C.

In another preferred embodiment, in step (C), the gas stream has a cyclically pulsing flow rate, wherein, based on the pulsing gas acceleration classification rule, catalysts having different activities have different particle densities, and have different accelerations in the pulsing gas flow field, so as to have different motion tracks and displacements, thereby eventually realizing efficient separation of highly and low activity catalysts.

In another preferred embodiment, in step (D), the high activity catalyst in a gas phase is separated and captured based on the highly efficient cyclonic separation rule, wherein the separation has a separation factor that is thousands of times that of gravity settling, such that the gas phase is free of the catalyst particles after separation, and at the same time, high-speed spinning of the catalyst particles in a cyclone further reinforces the solvent stripping.

In another aspect, the present disclosure provides an apparatus for the above method for treating, sorting and recycling an oil-containing discharged catalyst, wherein the apparatus comprises:

a catalyst charge/discharge tank and a cyclonic activation washer coupled to the catalyst charge/discharge tank for cyclonic washing and on-line activation of a discharged catalyst in step (A);

a cyclonic desorption stripping tank coupled with the cyclonic activation washer for cyclonic spinning solvent stripping of the catalyst in step (B);

a gas stream acceleration sorter coupled with the cyclonic desorption stripping tank and a pulsing gas stream generator coupled with the gas stream acceleration sorter for gas stream acceleration sorting of a high activity catalyst in step (C);

a high activity agent storage tank coupled with the gas stream acceleration sorter for cyclonic restripping and particle capture of the high activity catalyst in step (D); and a gas purifying tower coupled with the high activity agent storage tank for cooling of the gas and condensation removal of the solvent in step (E).

In a preferred embodiment, a liquid-solid cyclone is arranged in each of the catalyst charge/discharge tank and the cyclonic activation washer, wherein high-speed spinning of the particles in the cyclone enables the reinforced washing and on-line activation of the catalyst.

In another preferred embodiment, the apparatus further comprises a pipeline heater coupled with the cyclonic desorption stripping tank for heating the gas stream in the cyclonic desorption stripping tank to 200-400° C. to enable cyclonic reinforced stripping of the solvent entrained in the catalyst particles after the cyclonic washing, so as to remove the entrained solvent.

In another preferred embodiment, the gas stream acceleration sorter comprises a catalyst inlet, a gas stream inlet, a gas stream distributing plate, a high activity agent outlet and a low activity agent outlet;

wherein the pulsing gas stream generator enables generation of a pulsing gas stream in the gas stream acceleration sorter, wherein a maximum flow rate of the gas stream is such that a maximum flow velocity of the gas stream in a sorting column resides between a final free settling velocity of the high activity catalyst particles and a final free settling velocity of the low activity catalyst particles; wherein under the impact of the pulsing gas stream, the low activity particles having a larger density has a negative displacement that is larger than a positive displacement, resulting in a net displacement that is negative, and move downward directly from the low activity agent outlet to the low activity agent storage tank; wherein the high activity particles having a smaller density has a positive displacement that is larger than a negative displacement, resulting in a net displacement that is positive, and are discharged from the high activity catalyst outlet along with the gas stream;

wherein the pulsing gas stream generator comprises a variable frequency pulse valve.

In another preferred embodiment, a gas-solid cyclone separator is positioned in the high activity agent storage tank to enable reinforcement of the spinning restripping as well as the cyclonic separation and capture of the high activity catalyst entrained in the gas stream, resulting in dry high activity catalyst particles for recycling, wherein the capture of the catalyst has an efficiency of higher than 99%.

Beneficial Effects:

(1) The process for washing and desorption of the oil on the surface and in the pores of the discharged catalyst is reinforced by the mechanical detaching action in the high-speed shear force field in the cyclone and the centrifugal desorption action of the high-speed spinning of the catalyst particles on the pollutants in the pores. Meanwhile, owing to the high-speed spinning of the catalyst in the cyclonic field, the catalyst surface covered by heavy hydrocarbons is renewed, and the active sites reappear, so that rapid on-line activation of the catalyst is achieved.

(2) The process for solvent stripping of the catalyst is performed in the cyclonic field. The high-speed spinning of the particles in the cyclonic field accelerates the rate of replenishment of the adsorptive solvent and high-temperature gas stream in the catalyst, so as to reinforce the stripping process and enhance the stripping efficiency.

(3) Based on the gas stream acceleration classification rule, the pulsing gas stream is utilized to sort the high and low activity catalyst particles having different particle densities. The sorting is sensitive to density, and has high efficiency. Additionally, the dry sorting has no effect on the chemical or mechanical properties of the catalyst particles. The process flow is simple; the operation is easy; the running cost is low; and no secondary pollution is generated.

BRIEF DESCRIPTION OF THE DRAWINGS

The accompanying drawings are provided for better understanding of the disclosure. They constitute a part of the specification for further explanation of the disclosure without limiting the disclosure.

DETAILED DESCRIPTION

After extensive and intensive research, the inventors of the present application have discovered that the oil phase entrained in a discharged catalyst is mostly pore oil, and the main reason for the low efficiency in removing oil from the discharged catalyst is the difficulty in isolating the oil from the pores because of the large viscous drag force applied on the pore oil in the microchannels. However, in a high-speed spinning cyclonic field, the spinning speed of the catalyst particles may be tens of thousands of revolutions per minute, and can provide the pore oil with a centrifugal force that is larger than the viscous drag force, so that the pore oil escapes from the catalyst pores. Therefore, when the washing process where like dissolves like is conducted in a cyclone, the efficiency in removing the pore oil from the catalyst can be effectively enhanced. Meanwhile, owing to the high-speed spinning of the catalyst in the cyclonic field, the catalyst surface covered by heavy hydrocarbons is renewed, and the active sites are strengthened, so that on-line activation of the catalyst is achieved.

In addition, the main reason for catalyst deactivation is obstruction of catalyst channels by deposited carbon, metal and heavy hydrocarbons. Hence, the catalyst activity is directly proportional to the pore volume of the catalyst. In other words, it's inversely proportional to the particle density of the catalyst. High activity catalyst particles have a smaller density, while low activity catalyst particles have a larger density. The high activity catalyst and the low activity catalyst having different particle densities have different accelerations in the pulsing gas flow field, and thus have different tracks and displacements, thereby achieving highly efficient separation of the high activity catalyst and the low activity catalyst, and recycling of the high activity catalyst particles.

Based on the above discoveries, the inventors have developed a method and an apparatus for treating, sorting and recycling of an oil-containing discharged catalyst with the advantages of simple process, easy operation, high efficiency in removing oil, high efficiency in sorting catalysts, and the like. Therefore, the problems existing in the prior art have been solved effectively.

In a first aspect of the present disclosure, there is provided a method for treating, sorting and recycling an oil-containing discharged catalyst, wherein the method comprises the following steps:

(A) cyclonic washing and on-line activation of a discharged catalyst: asphaltenes, resins and heavy aromatics in the discharged catalyst are subjected to cyclonic washing based on the "like dissolves like" rule, wherein high-speed spinning of the catalyst particles in the cyclonic field reinforces the washing and desorption process of the pollutants in the catalyst pores, renews the catalyst surface covered by heavy hydrocarbons, and allows the active sites to reappear, so as to achieve rapid on-line activation of the catalyst;

(B) cyclonic spinning solvent stripping of the catalyst: catalyst particles obtained after the cyclonic washing and activation are subjected to high-temperature gas cyclonic spinning reinforced stripping to remove the solvent entrained in the catalyst;

(C) gas stream acceleration sorting of a high activity catalyst: high activity catalyst particles are sorted out efficiently on the basis of the kinematics regularity that a high activity catalyst and a low activity catalyst have different net pulsing displacement directions in a pulsing gas flow field due to their difference in particle density;

(D) cyclonic restriping and particle capture of the high activity catalyst: the high activity catalyst particles discharged along with the airflow after the sorting are further subjected to cyclonic spinning reinforced solvent stripping, while cyclonic capture of the catalyst particles is performed at the same time to recycle the high activity catalyst particles; and (E) cooling of the gas and condensation removal of the solvent: the gas is cooled after the cyclonic capture, and the entrained solvent is condensed, so as to obtain a pure gas for circulation.

In the present disclosure, the discharged catalyst in step (A) includes a catalyst used in a process selected from the group consisting of heavy oil hydrogenation, catalytic reformation, catalytic cracking, hydrocracking, hydrogenation refining, etc., and liquid-containing solid particles in a petrochemical process; and wherein the solvent used is gasoline, diesel or an organic solvent that is similar to and dissolves asphaltenes, resins and heavy aromatics in the discharged catalyst.

In the present disclosure, the washing process in step (A) is performed in a cyclonic field, wherein oil on a surface of the discharged catalyst and in pores of the discharged catalyst is subjected to cyclonic reinforced washing under a mechanical detaching action in a high-speed shear force field in the cyclonic field and a centrifugal desorption action of high-speed spinning of the catalyst particles on pollutants in the pores.

In the present disclosure, the discharged catalyst particles in step (A) spin at a high speed in the cyclonic field to renew catalyst particle surface covered by heavy hydrocarbons, and strengthen active sites of the catalyst, so as to achieve on-line activation of the catalyst.

In the present disclosure, in step (B), the solvent stripping is performed in a cyclonic field, wherein the high-speed spinning of the particles in the cyclonic field accelerates renewal of the contact interface between the solvent on the particle surface and the gas stream, so as to reinforce the stripping process for removing the solvent, wherein the gas is nitrogen, hydrogen, dry gas, low gas, etc., and the temperature is 200-400° C.

In the present disclosure, in step (C), the gas stream has a cyclically pulsing flow rate, wherein, based on the pulsing gas acceleration classification rule (catalysts having different activities have different particle densities, and have different accelerations in the pulsing gas flow field, so as to have different motion tracks and displacements), effective separation of the high activity catalyst and the low activity catalyst is eventually realized.

In the present disclosure, in step (D), the high activity catalyst in the gas phase is separated and captured based on the highly efficient cyclonic separation rule, wherein the separation has a separation factor that is thousands of times that of gravity settling, such that the gas phase is free of the catalyst particles after separation, and at the same time, high-speed spinning of the catalyst particles in a cyclone further reinforces the solvent stripping.

In a second aspect of the present disclosure, there is provided an apparatus for treating, sorting and recycling an oil-containing discharged catalyst, wherein the apparatus comprises:

a catalyst charge/discharge tank and a cyclonic activation washer coupled to the catalyst charge/discharge tank for cyclonic washing and on-line activation of the discharged catalyst in step (A);

a cyclonic desorption stripping tank coupled with the cyclonic activation washer for cyclonic spinning solvent stripping of the catalyst in step (B);

a gas stream acceleration sorter coupled with the cyclonic desorption stripping tank and a pulsing gas stream generator coupled with the gas stream acceleration sorter for gas stream acceleration sorting of the high activity catalyst in step (C);

a high activity agent storage tank coupled with the gas stream acceleration sorter for cyclonic restripping and particle capture of the high activity catalyst in step (D); and a gas purifying tower coupled with the high activity agent storage tank for cooling of the gas and condensation removal of the solvent in step (E).

In the present disclosure, a liquid-solid cyclone is arranged in each of the catalyst charge/discharge tank and the cyclonic activation washer, wherein the high-speed spinning of the particles in the cyclone enables the reinforced washing and on-line activation of the catalyst.

In the present disclosure, the gas stream acceleration sorter comprises a catalyst inlet, a gas stream inlet, a gas stream distributing plate, a high activity agent outlet (upper) and a low activity agent outlet (lower).

In the present disclosure, the pulsing gas stream generator enables generation of a pulsing gas stream in the gas stream acceleration sorter, wherein a maximum flow rate of the gas stream is such that a maximum flow velocity of the gas stream in a sorting column resides between a final free settling velocity of the high activity catalyst particles and a final free settling velocity of the low activity catalyst particles; wherein under the impact of the pulsing gas stream, the low activity particles having a larger density has a negative displacement (the positive direction is upward) that is larger than a positive displacement, resulting in a net displacement that is negative, and move downward directly from the low activity agent outlet (lower) to the low activity agent storage tank; wherein the high activity particles having a smaller density has a positive displacement that is larger than a negative displacement, resulting in a net displacement that is positive, and are discharged from the high activity catalyst outlet (upper) along with the gas stream.

In the present disclosure, the pulsing gas stream generator is a flow controller capable of regulating the gas flow rate in a pipeline into a sinusoidal or cosinusoidal waveform, such as a variable frequency pulse valve, etc.

In the present disclosure, the pipeline heater heats the gas stream in the cyclonic desorption stripping tank to 200-400° C. to enable cyclonic reinforced stripping of the solvent entrained in the catalyst particles after the cyclonic washing, so as to remove the entrained solvent.

In the present disclosure, a gas-solid cyclone separator is positioned in the high activity agent storage tank to enable reinforcement of the spinning restripping as well as the cyclonic separation and capture of the high activity catalyst entrained in the gas stream, resulting in dry high activity catalyst particles for recycling, wherein the capture of the catalyst has an efficiency of higher than 99%.

In the present disclosure, the gas purifying tower is used to cool the gas, so as to condense the solvent entrained in the gas and separate it from the gas, thereby obtaining a pure gas to be recycled.

Reference will be now made to the accompanying drawings.

Figure 1:
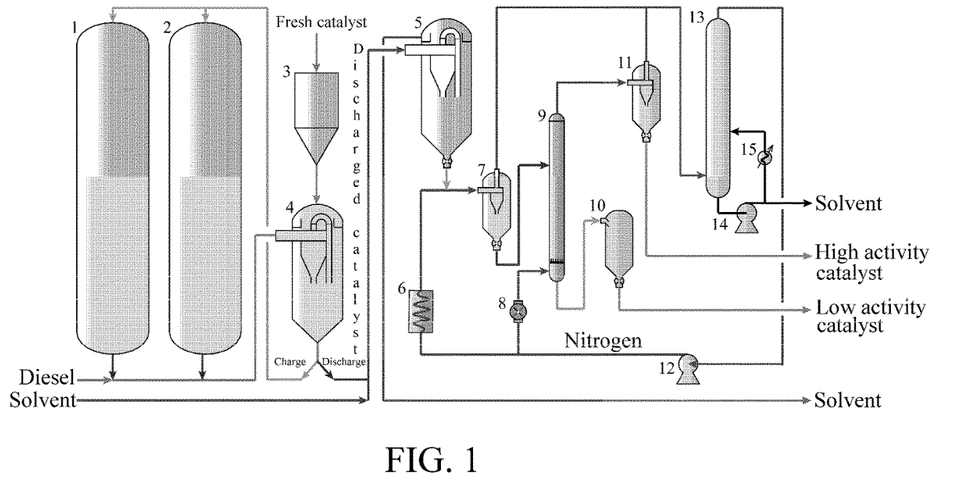
FIG. 1 shows a process flow for treatment, sorting and recycling of an oil-containing discharged catalyst according to a preferred embodiment of the present disclosure.

FIG. 1 shows a process flow for treatment, sorting and recycling of an oil-containing discharged catalyst according to a preferred embodiment of the present disclosure. As shown in FIG. 1, the apparatus utilizes two fluidized bed reactors 1, 2 in series. Addition of a fresh catalyst through a catalyst metering tank 3 (charge), transfer of the catalyst in the two reactors and discharge of the catalyst (discharge) are all fulfilled via a catalyst charge/discharge tank 4. In the treatment of the discharged catalyst, the catalyst discharged from the reactors are carried by diesel and delivered into the catalyst charge/discharge tank 4, wherein the discharged catalyst is preliminarily washed and activated in the cyclonic field in the catalyst charge/discharge tank 4. Afterwards, the discharged catalyst is carried by gasoline, diesel or an organic solvent that is similar to and dissolves asphaltenes, resins and heavy aromatics in the discharged catalyst and delivered into a cyclonic activation washer 5. In the cyclonic activation washer 5, the oil on the surface and in the pores of the discharged catalyst is subjected to cyclonic reinforced washing under a mechanical detaching action in a high-speed shear force field and a centrifugal desorption action of high-speed spinning of the catalyst particles on pollutants in the pores. At the same time, the catalyst particle surface covered by heavy hydrocarbons is renewed, and the active sites of the catalyst are strengthened, thereby achieving on-line activation of the catalyst. After the washing, the oil phase is discharged together with the solvent from an overflow port at the top of the cyclonic activation washer 5 for regeneration or reprocessing. After the washing, the catalyst particles entraining a portion of the solvent enter a cyclonic desorption stripping tank 7. A pipeline heater 6 heats the gas stream in the cyclonic desorption stripping tank 7 to 200-400° C. Under the spinning reinforcing action of the cyclonic field, the stripping desorption of the solvent is achieved. The catalyst particles with the solvent removed enter a gas stream acceleration sorter 9. A pulsing gas stream generator 8 regulates the gas flow rate in the gas stream acceleration sorter 9 into a sinusoidal or cosinusoidal pulse waveform. Nitrogen is used as a sorting gas. In the gas stream acceleration sorter 9, the low activity catalyst having a larger density has a net pulsing displacement that is negative, and thus directly falls on the bottom of the gas stream acceleration sorter 9 and enters a low activity agent storage tank 10. The high activity catalyst having a smaller density has a net pulsing displacement that is positive, and thus passes through the outlet at the top of the gas stream acceleration sorter 9 along with the gas stream and enters a high activity agent storage tank 11. In the high activity agent storage tank 11, the gas stream carrying the high activity catalyst particles is separated efficiently in a cyclone to provide the high activity catalyst particles which are returned to the reactor for reuse, while the gas stream carrying the solvent enters a gas purifying tower 13. In the gas purifying tower 13, the gas is cooled by a cooler 15, while the solvent entrained in the gas is condensed by a cooling pump 14. The resulting solvent is sent for regeneration or reprocessing, while the purified gas is recycled through a circulating fan 12.

EXAMPLES

The invention will be further illustrated with reference to the following specific Examples. It is nevertheless to be appreciated that these Examples are only intended to exemplify the invention without limiting the scope of the invention. The test methods in the following examples for which no specific conditions are indicated will be carried out generally under conventional conditions or under those conditions suggested by the manufacturers. Unless otherwise specified, all parts are parts by weight, and all percentages are percentages by weight.

Example 1

In a 2.60 million tons/year fluidized bed unit for hydrogenation of residual oil, the oil-containing discharged catalyst was treated, sorted and recycled using the inventive method and apparatus. The specific operating process and effects are described as follows:

1. Characteristics of the Discharged Catalyst

The catalyst discharged from the reactor contained components of residual oil, wax oil and diesel. Fresh catalyst consumed each day was 7354 kg/day. The equilibrium activity of the discharged catalyst was 54% of that of the fresh catalyst, wherein high activity (>80% of the activity of the fresh catalyst) catalyst particles amounted to at least ½ of the discharged catalyst. With the oil components converted into diesel, the discharged catalyst had a composition shown in Table 1.

TABLE 1

Discharged Catalyst Composition

| Components | Discharge per day (kg/day) |
|---|---|
| Sulfided Ni—Mo catalyst | 7354 |
| Deposited carbon | 2208 |
| Vanadium sulfide | 60 |
| Nickel sulfide | 1477 |
| Diesel | 3819 |
| Total | 14918 |

2. Procedure

The procedure was carried out according to the present disclosure as follows:

In this Example, the solvent was gasoline, and nitrogen was selected as the gas for cyclonic desorption solvent stripping of the catalyst and the gas for gas stream acceleration sorting of the high activity catalyst.

(1) The catalyst discharged from the catalyst charge/discharge tank 4 was carried by gasoline at a ratio of 1:20 (the discharge catalyst:gasoline) and delivered to the cyclonic activation washer 5. After washing, the oil on the surface and in the pores of the catalyst migrated into the gasoline, and returned from the overflow port at the top of the cyclonic activation washer to the reactor for reprocessing. After the on-line oil removal and activation, the catalyst particles entraining a small amount of gasoline settled to the bottom and entered the cyclonic desorption stripping tank 7.

(2) The pipeline heater 6 was used to heat nitrogen to 280° C. at which the light gasoline adsorbed on the catalyst particles entering the cyclonic desorption stripping tank 7 was subjected to cyclonic desorption stripping to desorb the entrained gasoline and impart a particulate state to the discharged catalyst. The catalyst entered the gas stream acceleration sorter 9.

(3) The pulsing gas stream generator 8 was used to regulate the gas flow rate in the gas stream acceleration sorter 9 into a sinusoidal pulse to sort out the high activity catalyst particles. The low activity catalyst particles having a larger density fell to the bottom of the gas stream acceleration sorter 9, and slipped into the low activity agent storage tank 10 from which the low activity catalyst particles were transported later to an outside site for disposal as a waste discharged catalyst. The high activity catalyst particles having a smaller density were discharged along with the gas from the top and entered the high activity agent storage tank 11 for gas-solid separation to obtain the high activity catalyst particles for recycling.

(4) The gaseous medium for the gas flow drying and sorting was mainly a mixture of nitrogen and light hydrocarbons. The mixture entered the gas purifying tower 13 for purification of nitrogen, and the light hydrocarbons were recovered.

3. Effects (1) The effect of oil removal

Figure 2:
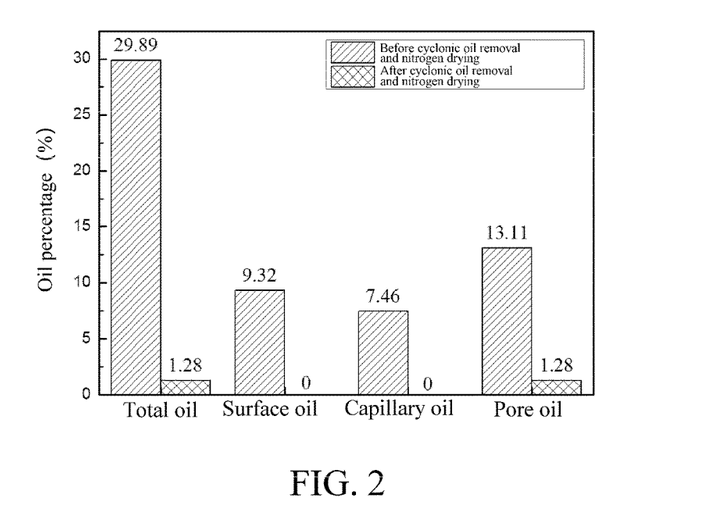
FIG. 2 shows the effect of removing oil by the treatment, sorting and recycling of an oil-containing discharged catalyst according to a preferred embodiment of the present disclosure.

After the free oil was removed by settling and decanting, the total oil percentage in the discharged catalyst was 29.80%, wherein the surface oil on the surface of the catalyst particles was 9.32%, the capillary oil in the interstice between the catalyst particles was 7.46%, and the pore oil in the micropores of the catalyst particles was 13.11%. After further removing the oil by cyclonic spinning, nitrogen blowing and drying, the total oil percentage was reduced to 1.28%, wherein the surface and capillary oil was removed completely, while the efficiency in removing the pore oil reached 90.2%. FIG. 2 shows the oil contents in the discharged catalyst before and after the treatment of the catalyst. When the method and apparatus of the present disclosure are used to treat and recycle the catalyst discharged from a 2.60 million tons/year fluidized bed unit for hydrogenation of residual oil, 1300 ton diesel/year can be recovered, equivalent to saving oil expense of ¥ 4.90 million Yuan per year based on a diesel price of ¥ 3770 Yuan/ton. In addition, contribution was made to environmental protection.

(2) The Effect of Activation

Figure 3:
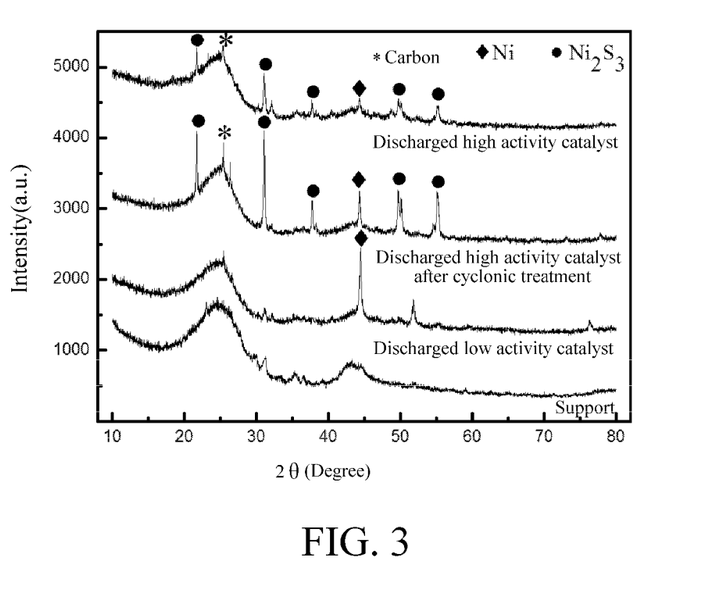
FIG. 3 shows the effect of activating an oil-containing discharged catalyst by the treatment, sorting and recycling of the catalyst according to a preferred embodiment of the present disclosure.

FIG. 3 shows the XRD patterns of four kinds of catalyst particles: the catalyst support, the discharged low activity catalyst, the discharged high activity catalyst, and the cyclonically treated discharged catalyst. The active specifies on the catalyst support was nickel sulfide. As shown by the XRD patterns of the activated catalyst particles from which the oil was removed by cyclonic spinning, the diffraction peaks of Ni and $Ni_2S_3$ exhibited significantly higher intensities than the high activity catalyst particles that were discharged directly. This result demonstrates that the resins and heavy hydrocarbons adhered to the surface and pores of the discharged high activity catalyst particles were desorbed after the cyclonic desorption, and the effective active sites of the catalyst were exposed again. By subjecting the catalyst particles to cyclonic desorption, physical activation of the discharged catalyst particles was achieved.

(3) The Effect of Sorting High Active Catalyst

When a hydrogenation catalyst is used in a fluidized bed, carbon, metal, heavy hydrocarbons and the like deposit gradually in the pores of the catalyst, such that the micropore channels are blocked and the activity decreases gradually. Hence, the catalyst activity is directly proportional to the catalyst pore volume, i.e. inversely proportional to the catalyst particle density. The higher activity catalyst has a smaller particle density, whereas the lower activity catalyst has a larger particle density. Table 2 below lists the particle densities of catalysts having different activities.

TABLE 2

Particle densities of catalysts having different activities

| Pore volume (activity) | 100% | 75% | 50% | 25% | 0% |
|---|---|---|---|---|---|
| Particle density (g/cm$^3$) | 1.612 | 1.788 | 1.886 | 2.117 | 2.262 |

Figure 4:
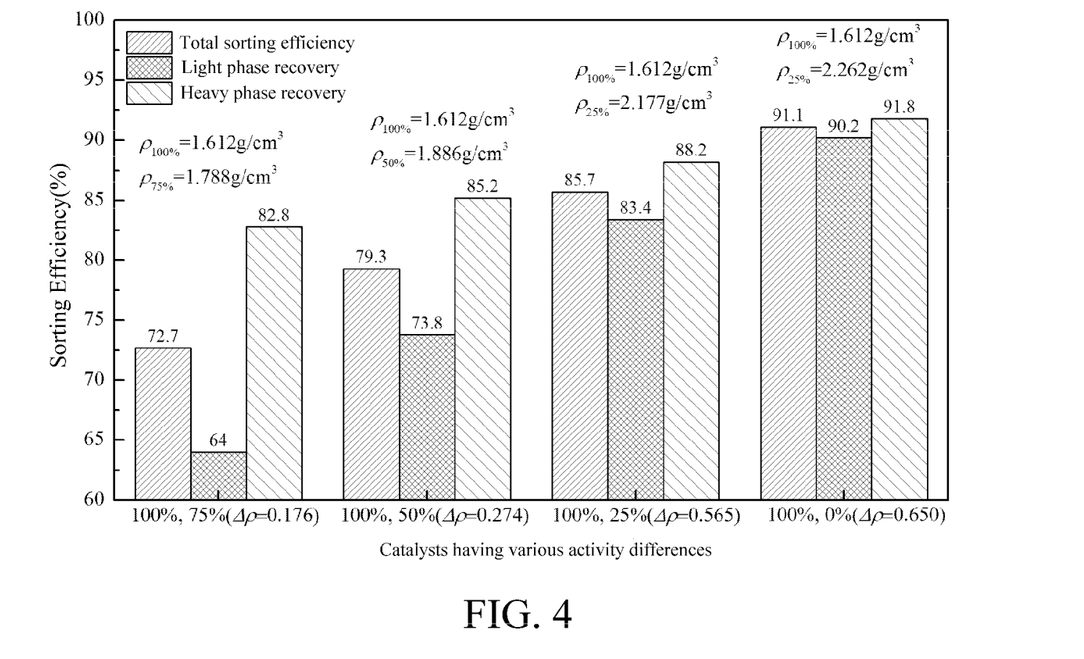
FIG. 4 shows the effect of sorting a high activity catalyst by the treatment, sorting and recycling of an oil-containing discharged catalyst according to a preferred embodiment of the present disclosure.

FIG. 4 shows the effect of sorting the catalysts having different activities in a fluidized bed using the method and apparatus of the present disclosure. For instance, with respect to the 100% activity catalyst and 25% activity catalyst, the total sorting effect reaches 85.7%, and the recovery of the high activity catalyst (light phase) reaches 83.4%. When the catalyst discharged from a 2.60 million tons/year fluidized bed unit for hydrogenation of residual oil is treated and recycled, 400 ton catalyst particles having an activity greater than 80% of the activity of a new catalyst may be recovered per year. As a result, the consumption of fresh catalyst may be reduced by 300 tons/year, and the hazardous waste from the whole unit may be reduced by 30%.

The implementation of this technique can effectively reduce the running cost of the process, save resources, protect environment, and meet the strategic direction of the petrochemical industry towards "low carbon, green, efficient, energy saving" sustainable development.

The Examples listed above are only preferred examples in the disclosure, and they are not intended to limit the scope of the disclosure. Equivalent variations and modifications according to the disclosure in the scope of the present application for invention all fall in the technical scope of the disclosure.

All of the documents mentioned in the disclosure are incorporated herein by reference, as if each of them were incorporated herein individually by reference. It is to be further understood that various changes or modifications to the invention can be made by those skilled in the art after reading the above teachings of the invention, and these equivalent variations fall in the scope defined by the accompanying claims of the application as well.

What is claimed is:

1. A method for treating, sorting and recycling an oil-containing discharged catalyst, wherein the method comprises the following steps:
    (A) cyclonic washing and on-line activation of a discharged catalyst: asphaltenes, resins and heavy aromatics in the discharged catalyst are subjected to cyclonic washing to achieve on-line activation of the catalyst;
    (B) cyclonic spinning solvent stripping of the catalyst: catalyst particles obtained in step (A) are subjected to high-temperature gas cyclonic spinning reinforced stripping using a gas stream to remove a solvent entrained in the catalyst;
    (C) gas stream acceleration sorting of a high activity catalyst: high activity catalyst particles are sorted out from the catalyst obtained in step (B) using the gas stream, wherein the high activity catalyst and a low activity catalyst are subject to different net pulsing displacement directions in a pulsing gas flow field of the gas stream;
    (D) cyclonic restriping and particle capture of the high activity catalyst: the high activity catalyst particles discharged along with the gas stream after the sorting in step (C) are further subjected to cyclonic spinning reinforced solvent stripping, while cyclonic capture of the catalyst particles is performed at the same time to recycle the high activity catalyst particles; and
    (E) cooling of the gas and condensation removal of the solvent: the gas stream from step (D) is cooled after the cyclonic capture, and the entrained solvent is condensed, so as to obtain a pure gas for circulation.

2. The method of claim 1, wherein, in step (A), the discharged catalyst includes liquid-containing solid particles in a process selected from the group consisting of heavy oil hydrogenation, catalytic reformation, catalytic cracking, hydrocracking and hydrogenation refining; and wherein the solvent used is gasoline, diesel, or an organic solvent capable of dissolving asphaltenes, resins and heavy aromatics in the discharged catalyst;
    wherein the cyclonic washing is performed in a cyclonic field, wherein oil on a surface of the discharged catalyst and in pores of the discharged catalyst is subjected to cyclonic reinforced washing under a mechanical detaching action in a shear force field in the cyclonic field and a centrifugal desorption action of spinning of the catalyst particles on pollutants in the pores; and
    wherein the discharged catalyst particles spin in the cyclonic field to renew the catalyst particle surface coated by heavy hydrocarbons, and strengthen active sites of the catalyst, so as to achieve on-line activation of the catalyst.

3. The method of claim 1, wherein, in step (B), the solvent stripping is performed in a cyclonic field, wherein spinning of the particles in the cyclonic field accelerates renewal of a contact interface between the solvent on the particle surface and the gas stream, so as to reinforce the stripping process for removing the solvent, wherein the gas is nitrogen, hydrogen, dry gas or low gas, and a temperature is 200-400° C.

4. The method of claim 1, wherein, in step (C), the gas stream has a cyclically pulsing flow rate, wherein catalysts having different activities have different particle densities, and have different accelerations in the pulsing gas flow field, so as to have different motion tracks and displacements, thereby realizing efficient separation of high activity and low activity catalysts.

5. The method of claim 1, wherein, in step (D), the high activity catalyst in a gas phase is separated wherein the separation has a separation factor greater than 1000 times a separation factor of gravity settling, such that the gas phase is free of the catalyst particles after separation, and at the same time, spinning of the catalyst particles in a cyclone further reinforces the solvent stripping.

6. An apparatus for use in the method of claim 1 for treating, sorting and recycling an oil-containing discharged catalyst, wherein the apparatus comprises:
    a catalyst charge/discharge tank 4 and a cyclonic activation washer 5 coupled to the catalyst charge/discharge tank 4 for cyclonic washing and on-line activation of the discharged catalyst in step (A);
    a cyclonic desorption stripping tank 7 coupled with the cyclonic activation washer 5 for cyclonic spinning solvent stripping of the catalyst in step (B);
    a gas stream acceleration sorter 9 coupled with the cyclonic desorption stripping tank 7 and a pulsing gas stream generator 8 coupled with the gas stream acceleration sorter 9 for gas stream acceleration sorting of the high activity catalyst in step (C);
    a high activity agent storage tank 11 coupled with the gas stream acceleration sorter 9 for cyclonic restripping and particle capture of the high activity catalyst in step (D); and
    a gas purifying tower 13 coupled with the high activity agent storage tank 11 for cooling of the gas and condensation removal of the solvent in step (E).

7. The apparatus of claim 6, wherein a liquid-solid cyclone is arranged in each of the catalyst charge/discharge tank 4 and the cyclonic activation washer 5, wherein spinning of the particles in the cyclone enables the reinforced washing and on-line activation of the catalyst.

8. The apparatus of claim 6, wherein the apparatus further comprises a pipeline heater 6 coupled with the cyclonic desorption stripping tank 7 for heating the gas stream in the cyclonic desorption stripping tank 7 to 200-400° C. to enable cyclonic reinforced stripping of the solvent entrained in the catalyst particles after the cyclonic washing, so as to remove the entrained solvent.

9. The apparatus of claim 6, wherein the gas stream acceleration sorter 9 comprises a catalyst inlet, a gas stream inlet, a gas stream distributing plate, a high activity agent outlet and a low activity agent outlet;

wherein the pulsing gas stream generator 8 enables generation of a pulsing gas stream in the gas stream acceleration sorter 9, wherein a maximum flow rate of the gas stream is such that a maximum flow velocity of the gas stream in a sorting column resides between a final free settling velocity of the high activity particles and a final free settling velocity of the low activity particles;

wherein under impact of the pulsing gas stream, the low activity particles having a larger density has a negative displacement that is larger than a positive displacement, resulting in a net displacement that is negative, and move downward directly from the low activity agent outlet to the low activity agent storage tank 10; wherein the high activity particles having a smaller density has a positive displacement that is larger than a negative displacement, resulting in a net displacement that is positive, and are discharged from the high activity catalyst outlet along with the gas stream; and     wherein the pulsing gas stream generator 8 comprises a variable frequency pulse valve.

10. The apparatus of claim 6, wherein a gas-solid cyclone separator is positioned in the high activity agent storage tank 11 to enable reinforcement of the spinning restripping as well as the cyclonic separation and capture of the high activity catalyst entrained in the gas stream, resulting in dry high activity catalyst particles for recycling, wherein the capture of the catalyst has an efficiency of higher than 99%.

* * * * *